United States Patent [19]
Cohen et al.

[11] Patent Number: 5,946,380
[45] Date of Patent: Aug. 31, 1999

[54] COMMUNICATIONS SYSTEM AND METHOD WITH CALL EXPENDITURE CONTROL

[75] Inventors: Steve L. Cohen, Summit; Michael Davitt, Berkley Heights; Leonard Matulewski, Andover; Alan B. Moshinsky, Somerville; Kathleen T. Quinn, Denville; Usha Rao, Randolph, all of N.J.

[73] Assignee: AT&T Corp., Middletown, N.J.

[21] Appl. No.: 08/965,521

[22] Filed: Nov. 6, 1997

[51] Int. Cl.$^6$ .................................................. H04M 15/00
[52] U.S. Cl. ........................... 379/127; 379/121; 379/115; 379/67.1
[58] Field of Search ........................... 379/112–115, 121, 379/127, 130, 131, 210, 211, 212, 207, 67.1, 144, 70; 455/404, 405, 406, 407, 408

[56] References Cited

U.S. PATENT DOCUMENTS

| | | | |
|---|---|---|---|
| 4,706,275 | 11/1987 | Kamil | 379/144 |
| 4,776,000 | 10/1988 | Parienti | 455/407 |
| 5,265,155 | 11/1993 | Castro | 379/112 |
| 5,353,335 | 10/1994 | D'Urso et al. | 379/67 |
| 5,440,621 | 8/1995 | Castro | 379/112 |
| 5,673,306 | 9/1997 | Amadon et al. | 455/406 |
| 5,818,915 | 10/1998 | Hayes, Jr. et al. | 379/114 |

*Primary Examiner*—Paul Loomis

[57] ABSTRACT

A communication system includes a network switch coupled through a telephone line uniquely associated with each customer for budgeted telephone calling time and amount, either pre-paid or post-paid, the budgeted amount being recorded in the system for calling purposes. A server is coupled to the switch for automated control of the budgeted telephone calls and costs. The server includes a control processor having access to databases for recorded budgeted amounts and call routing. A voice response unit is coupled to the processor and sends messages to the calling customer at the beginning of each budget telephone call indicating remaining budgeted telephone calling time and amount available to the calling purposes. The processor debits the customer account by an amount reflecting the call costs as the call proceeds. A voice message advises the calling customer when the available time and costs for the budgeted telephone call will terminate. Depending upon customer preference, the call may (i) terminate when the budget amount is exceeded or (ii) continue subject to a warning that the call budget has been exceeded with a prompt to obtain additional prepaid budgeted calling time and cost or (iii) continue the call and subsequent calls subject to later payment by the calling customer. Calls are placed directly to the calling party without accessing a special toll number or providing a credit card number.

20 Claims, 6 Drawing Sheets

COMMUNICATIONS SYSTEM AND METHOD WITH CALL EXPENDITURE CONTROL

BACKGROUND OF THE INVENTION

1. Field of the Invention:

This invention relates to communication systems. More particularly, the invention relates to a communications system and method for budgeted payment of communication services using stored information in the communication system.

2. Description of Prior Art:

Pre-paid telephone services is one form of budgeted telephone calling which enable a customer to budget and control telephone calling expenditures in advance of calling. One example of such service is a pre-paid calling card which is issued in a given monetary amount and/or calling time after payment by the customer. When the card amount or time is expended, the customer is required to repurchase another card which may be inconvenient and time consuming.

Another form of such budgeted service is a pre-paid calling time or amount stored in a communication system which is debited as the calling time is expended. A customer is required to make arrangements with the communications system to renew the calling time which, again, may be inconvenient and time consuming. What is needed is a budgeted calling amount, pre-paid or post paid, uniquely related to a caller's telephone number, the budgeted amount being stored in a communications system which automatically provides the caller with pre-defined options for renewing or terminating the budgeted amount prior to or after the amount has been expended.

Prior art related to budgeted telephone calling service includes the following:

U.S. Pat. No. 4,706,275 issued Nov. 10, 1987, discloses a telephone system enabling pre-payment for telephone calls wherein a special code and credit information is stored in special exchanges and debited as the call progresses. The call is disconnected when the pre-payment amount has been spent without any automatic arrangement for renewing the pre-payment amount.

U.S. Pat. No. 5,265,155 issued Nov. 23, 1993, and 5,440,621 issued Aug. 8, 1995, disclose a method for storing telecommunication time data representative of a pre-purchased amount in a network. A telecommunications connection is established between first and second telecommunication devices. When the connection is terminated, the time duration of the connection is measured. The stored telecommunication time data is processed to indicate a decrement in the available time which is essentially equal to the measured time duration of the connection.

U.S. Pat. No. 5,353,335 issued Oct. 4, 1994, discloses a pre-paid telephone system in which a telephone user buys a predetermined amount of service beforehand and receives a card imprinted with the unique account number. A plurality of toll-free access numbers allow the user to access a pre-paid telephone system. Each of those numbers causes the pre-paid system to interact with the user if the user has enough available credit to pay for at least a minimal amount of calling time, a call is completed. A timer is set with the amount of calling time permitted by the available balance. The timer runs during the course of the phone call and the call is disconnected when the timer runs out. If the call is ended prior to the timer running out, a new available balance is computed in light of the time remaining on the timer. The user can make additional phone calls using the new available credit balance.

None of the prior art discloses a communications system including budgeted calling amounts uniquely identified with a caller for directly calling a called party without using a special toll number or credit card, the budgeted amounts being stored in the system and debited as calling connections take place whereupon the system provides automatic pre-defined courses of action for pre-paid or post paid service for call completion upon expenditure of the budgeted amount in extending or renewing the budgeted amount or terminating the budgeted calling services.

SUMMARY OF THE INVENTION

A communications system which includes at least one network switch coupled in part to at least one caller via a telephone line uniquely associated with that caller for receiving a call from that caller to a destination and establishing the caller's identity in accordance with a number associated with the caller's telephone line. A data base stores information in accordance with the caller's telephone number, the information including budgeted calling amount for the caller. A control processor is responsive to a call initiated by the caller for accessing the data base to obtain the information in accordance with the caller's telephone line number and establishing a maximum allowable time for the caller's call based on the information and the destination of the caller's call. The processor monitors the call in progress to determine how much time has elapsed. A voice response unit is coupled to the processor and to the network for sending at least one message to the caller indicative of the amount of time available to the caller as the call progresses. Prior to the expenditure of the budgeted calling amount, the system provides the caller with several options. In one option, the call may terminate when the budget amount is exceeded. In a another option, the call may continue subject to a warning that the call budget has been exceeded with a prompt to obtain additional budgeted calling time and costs for updating the recorded amounts in the system. In still another option, the call and subsequent calls may continue subject to later payment by the customer. All calls are placed to called parties without accessing special toll numbers or the use of credit cards.

DESCRIPTION OF PREFERRED EMBODIMENT

Figure 1:
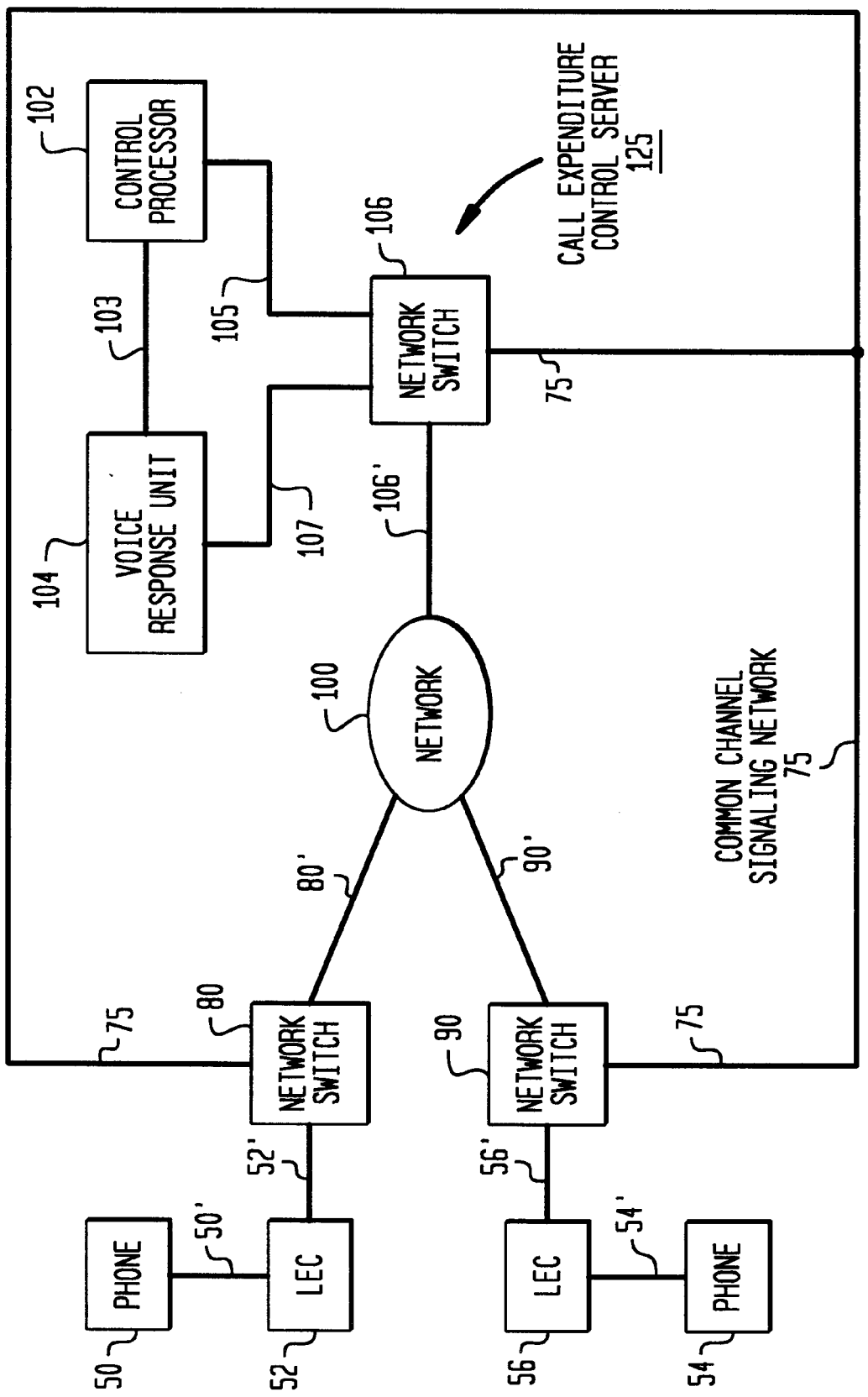
FIG. 1 is a block diagram of the communication network including a call expenditure control server incorporating the principles of the present invention.

FIG. 1 discloses a communications network 100 which in one form may be a Common Channel Signal Network (CCSN) coupled to a plurality of network switches 80 and 90, such as Electronic Switching System No. 4 (4ESS) for completing calls between local telephones 50, 54. Local Exchange Carriers (LEC) 52 and 56, respectively, are connected to the phones 50 and 54 through links 50' and 54', respectively. The local exchange carriers are also connected to the network switches 80 and 90, through links 52' and 56', respectively. The network 100 is also connected to a Call Expenditure Control Server 125 including a network switch 106 coupled to a control processor 102 through link 105 and to a Voice Response Unit 104 through a link 107. The voice response unit and control processor 102 are connected together through a link 103.

The server 125 provides budgeted calling service, either pre-paid or post paid, to customers using the phones 50, 54 . . . . The customer obtains the prepaid, budgeted calling service by calling a Customer Service Representative and ordering the service for his unique telephone line. The service enables the caller to place a call directly to a called party without accessing a special toll number or using a credit card. The customer sets the purchase limit threshold and determines whether a "Hard-Stop" or a "Soft-Stop" service will be implemented when a budgeted calling monetary amount is about to be exceeded. In a "hard-stop" option, the customer will receive a balance depletion warning stating "YOU HAVE TWO MINUTES OF CALL TIME REMAINING ON YOUR BUDGETEDD BALANCE." The customer will be disconnected upon the expiration of the two-minute warning notice. Alternatively, if selected in advance, the customer will hear "YOUR BUDGETED BALANCE HAS BEEN EXPENDED. THIS CALL MAY BE CONTINUED FOR A CHARGE TO YOUR REGULAR ACCOUNT." In subsequent call-attempts after the customer has reached his budgeted balance limit, the customer hears the announcement "YOU HAVE DEPLETED YOUR BUDGETED BALANCE FOR THE MONTH, PLEASE CALL 1-800-555-5555 IF YOU WOULD LIKE TO MODIFY YOUR PURCHASE LIMIT." and the call is blocked. The timer stops for the option announcement and restarts at the end of the announcement so that the customer does not get billed for the duration of the announcement.

In the "soft-stop" option, when the customer reaches the end of the prepaid purchase balance limit, the customer receives the announcement, "YOU HAVE REACHED YOUR LIMIT BUT WILL BE ALLOWED TO CONTINUE TO TALK. IF YOU WOULD LIKE TO REPLENISH/MODIFY YOUR PURCHASE LIMIT, PLEASE CALL 1-800-555-5555". The announcement is heard only by the calling party and the call is allowed to continue. The timer stops for the announcement and restarts at the end of the announcement so that the customer does not get billed for the duration of the announcement. On subsequent toll call attempts after the customer has reached the budgeted amount, the customer hears the announcement, "YOU HAVE DEPLETED YOUR BUDGETED BALANCE FOR THE MONTH" and the call is set up (on subsequent calls, the customer will be reminded that the balance has been exceeded, but the call precedes as normal although the threshold has been exceeded). The charges for such calls and subsequent calls are billed to the customer's regular telephone account for the unique telephone line.

Thus, the present invention provides the customer with a convenient and efficient mechanism for continuing budgeted calling without accessing a special toll or using a credit card, except contacting the local service representative or an "800" number to renew or modify the budgeted amount, thereby saving time for extending the service and overcoming the limitation of the prior art.

Figure 2:
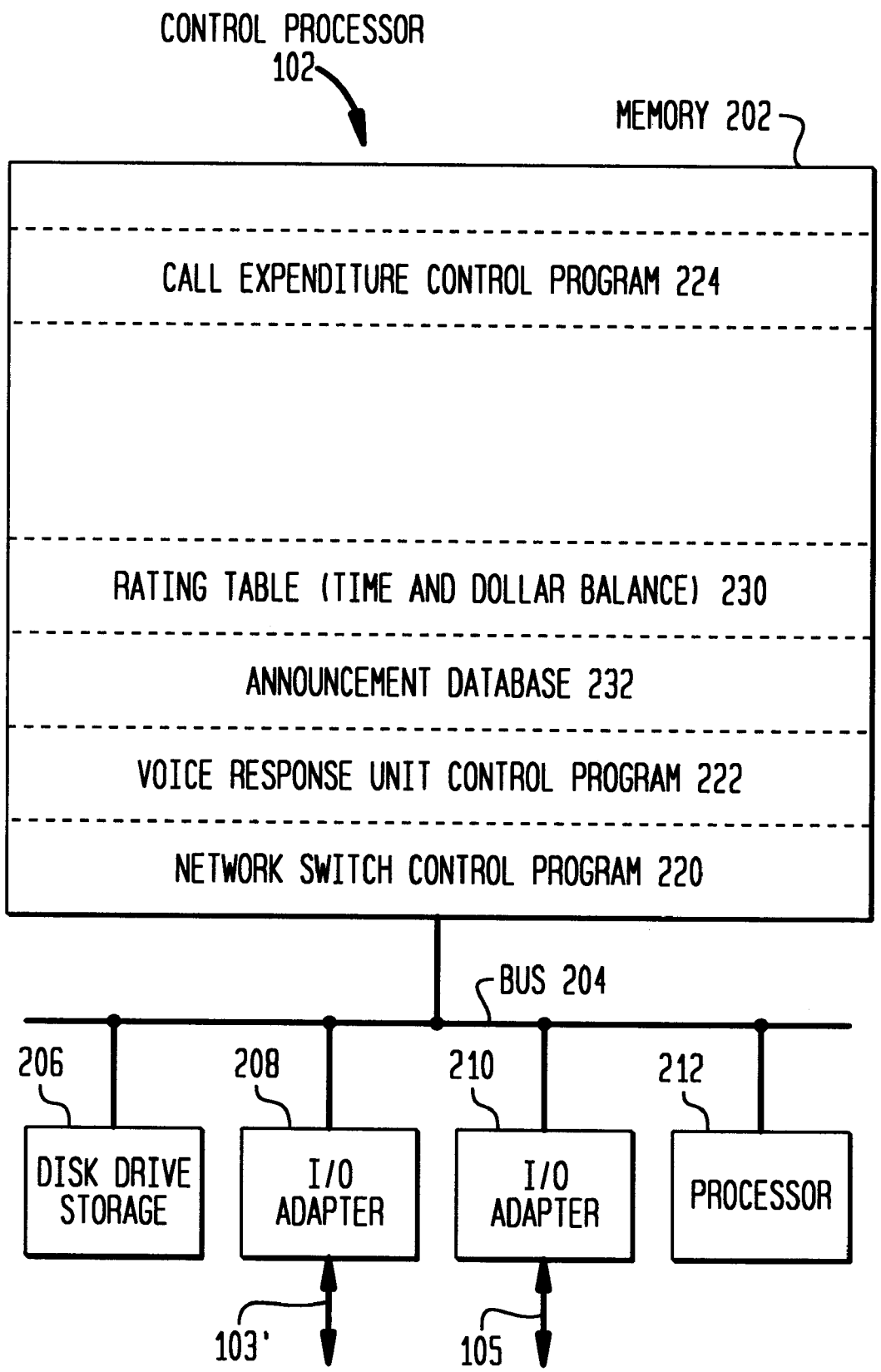
FIG. 2 is an architectural diagram of a control processor and the expenditure control server of FIG. 1.

Turning to FIG. 2, the control processor 102 in the control server 125 (see FIG. 1) includes a memory 202 coupled through a buss 204 to a disk drive storage 206; an I/O adapter 208 coupled to the voice response unit 104 through link 103; an I/O adapter 210 coupled to the network switch 106, through the link 105 and a processor 212 for executing the stored program instructions in the memory 202. A call expenditure control program 224 monitors each budgeted telephone call and implements a "hard-stop" or "soft-stop" option according to the customer preference. A rating table database 230 records the time and dollar balances for each prepaid, budgeted customer. The rating table is decremented as the call is monitored by the call expenditure control program 224. An announcement database 232 contains the announcement for the "soft-stop" and "hardstop" options. The database 232 also includes a welcoming announcement advising the customer at the time of call placement of the time and dollar balance available at the beginning of the call. Optionally, the programs 230 and 232 may be installed as an adjunct platform to a network switch routing the budgeted call. A voice response unit control program 222 is activated by the call expenditure control program 224 to supply the announcement in the database 232 at the appropriate time in a budgeted call. A network switch control program 220 interfaces with the network switch 106 for monitoring the call and sending the announcements.

Figure 3:
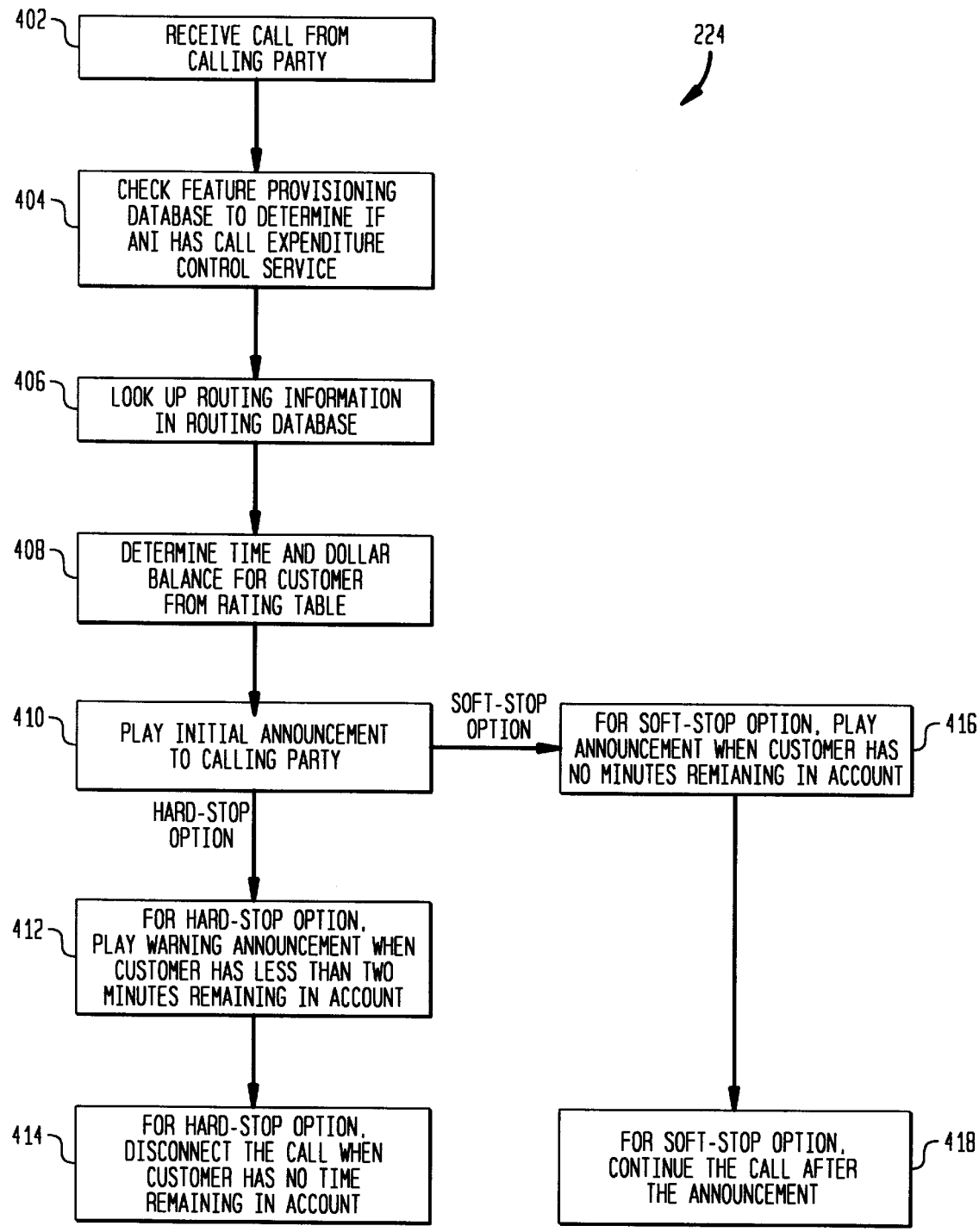
FIG. 3 is a flow diagram of a call expenditure control program that runs in the control processor of FIG. 2.

In FIG. 3, the call flow from a customer subscribing to the budgeted calling service is initiated in an operation 402 in which the calling party connects to the network 100 as a regular toll call using the prefix digit "1", unlike the prior art which uses special toll numbers and credit card numbers. The originating local exchange carrier delivers the call to the network switch 80, 90 as the case may be. In an operation 404, the originating switch performs an Automatic Number Identification Trigger Table (ANITT) Look-up in a provisioning database to determine if the ANI has call expenditure control service. Optionally, other software programs may be employed to perform the function of the Trigger Table. If the ANI 222 has a match, an operation 406 is performed to look-up routing information in a routing database to direct the call where the control server 125 is located. When the server receives the call, an operation 408 is performed in which the server looks at a rating table base to determine a time and dollar value for the customer placing the call. The server routes the call to the appropriate network switch while remaining hairpinned for the duration of the call. The network switch routes the call to the terminating local exchange carrier. The network switch also appends a special automatic machine accounting module containing budgeted calling service information. During call set up, the server plays an initial announcement to the calling party in an operation 410. The announcement states, "YOU HAVE A BALANCE OF $XX AND CAN SPEAK FOR XX MINUTE. THANK YOU FOR USING AT&T." The terminating local exchange carrier routes the call to the called party for completion. Once a connection is established, the server tracks the progress of the call using the control program 224 and decrements the time and dollar balance accordingly in the rating table data base 230. For a "hard-stop" option, the server activates a warning announcement in an operation 412 when the customer has two or less than two minutes left on the call. The processor 102 activates the voice response unit control program 222 to send the announcement, "YOU HAVE 2 MINUTES REMAINING. IF YOU WOULD LIKE TO MODIFY YOUR PURCHASED LIMIT, PLEASE CALL 1-800-555-5555." The warning announcement is heard only by the calling party.

The timer stops when the announcement begins to play and restarts when the announcement completes playing. When the two minutes is completed, the call is disconnected in an operation 414 when the customer has no time remaining in the account.

For a "soft-stop" option, the server plays an announcement in an operation 416 when the customer has no minutes remaining in the account. Again, the voice response unit is activated to play the announcement, "YOU HAVE REACHED YOUR LIMIT BUT WILL BE ALLOWED TO CONTINUED TO TALK. IF YOU WOULD LIKE TO REPLENISH/MODIFY YOUR PURCHASE LIMIT, PLEASE CALL 1-800-555-5555." The announcement is heard only by the calling part. The timer stops when the announcement begins to play and restarts when the announcement completes playing. For the "soft-stop" option, the call continues after the announcement in an operation 418. The calling party is billed for the entire duration of the call.

Figure 4:
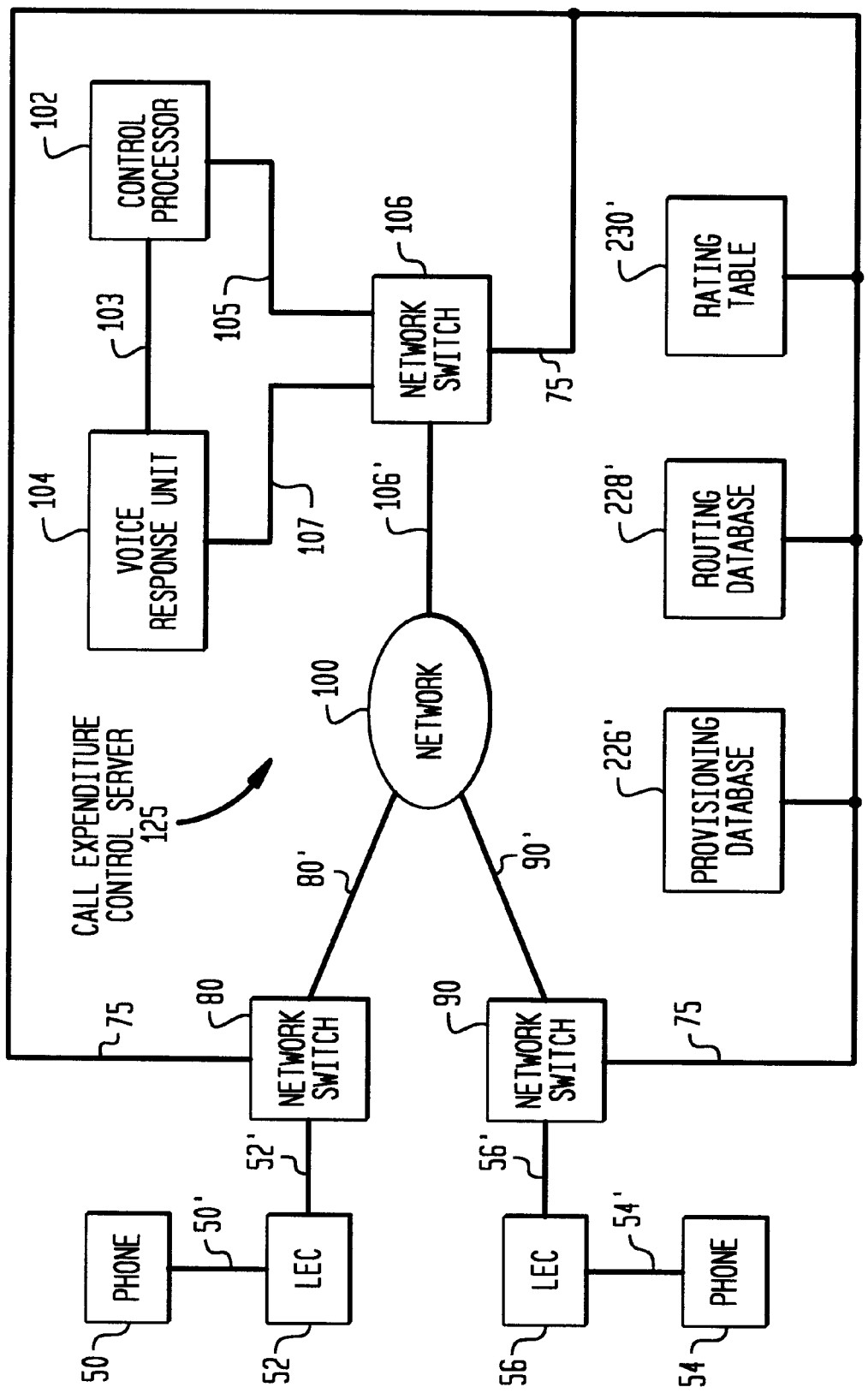
FIG. 4 is an alternate embodiment of FIG. 2 in which data bases in the expenditure control server are distributed throughout the network.

FIG. 4 discloses a budgeted calling service in which the provision data base 226', routing database 228' and rating table database 230' are distributed throughout the network 100 and to which the network switches 80, 90, and the like have access to such databases. FIG. 4 enables a memory 202 (See FIG. 2) of the control server to be reduced in size and further distributed throughout the network, thereby increasing the response time for budgeted services to customerS.

Figure 5:
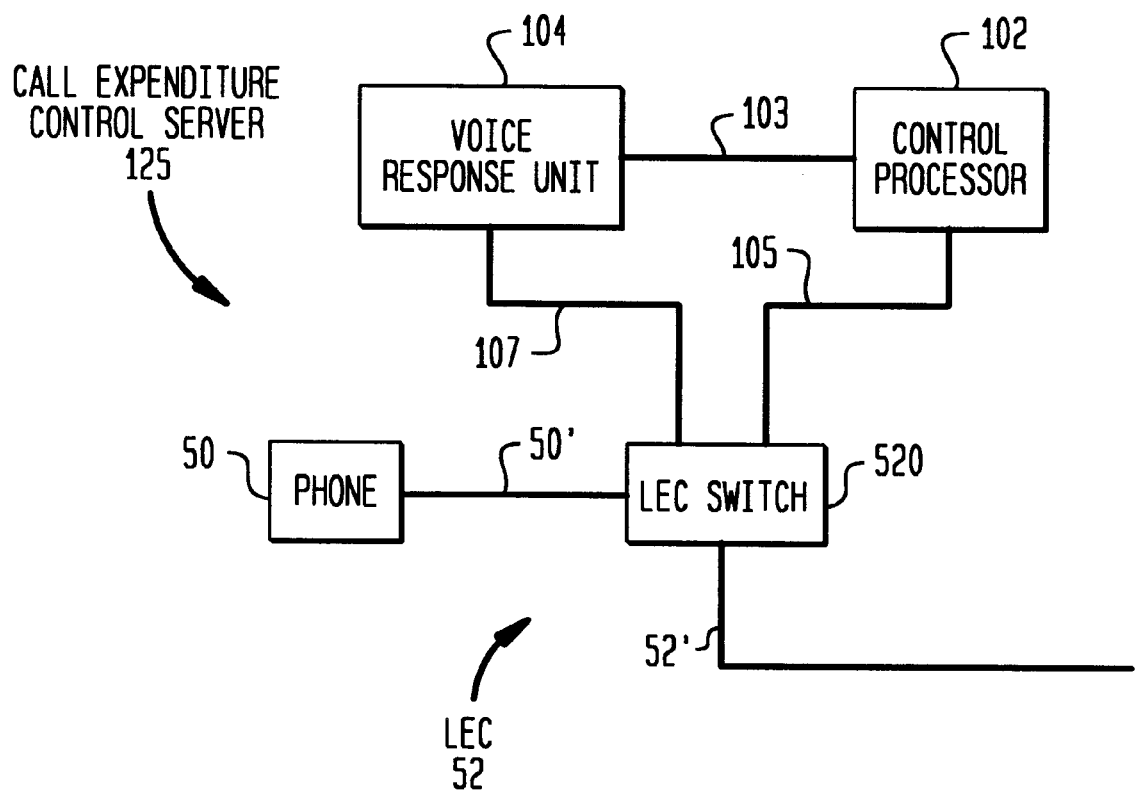
FIG. 5 is a block diagram of another embodiment for connecting the call expenditure control server to a customer.

FIG. 5 discloses still another embodiment of providing budgeted service to customers. In FIG. 5 the control service is connected to the local exchange carrier switch 520 which is connected to the network switch through link 52', and the phone through link 50'. Again, the memory 202 (see FIG. 2) may be reduced because the number of customers served by the switch 520 will be less than the number of customers served by the server and the system shown in FIG. 1.

Figure 6:
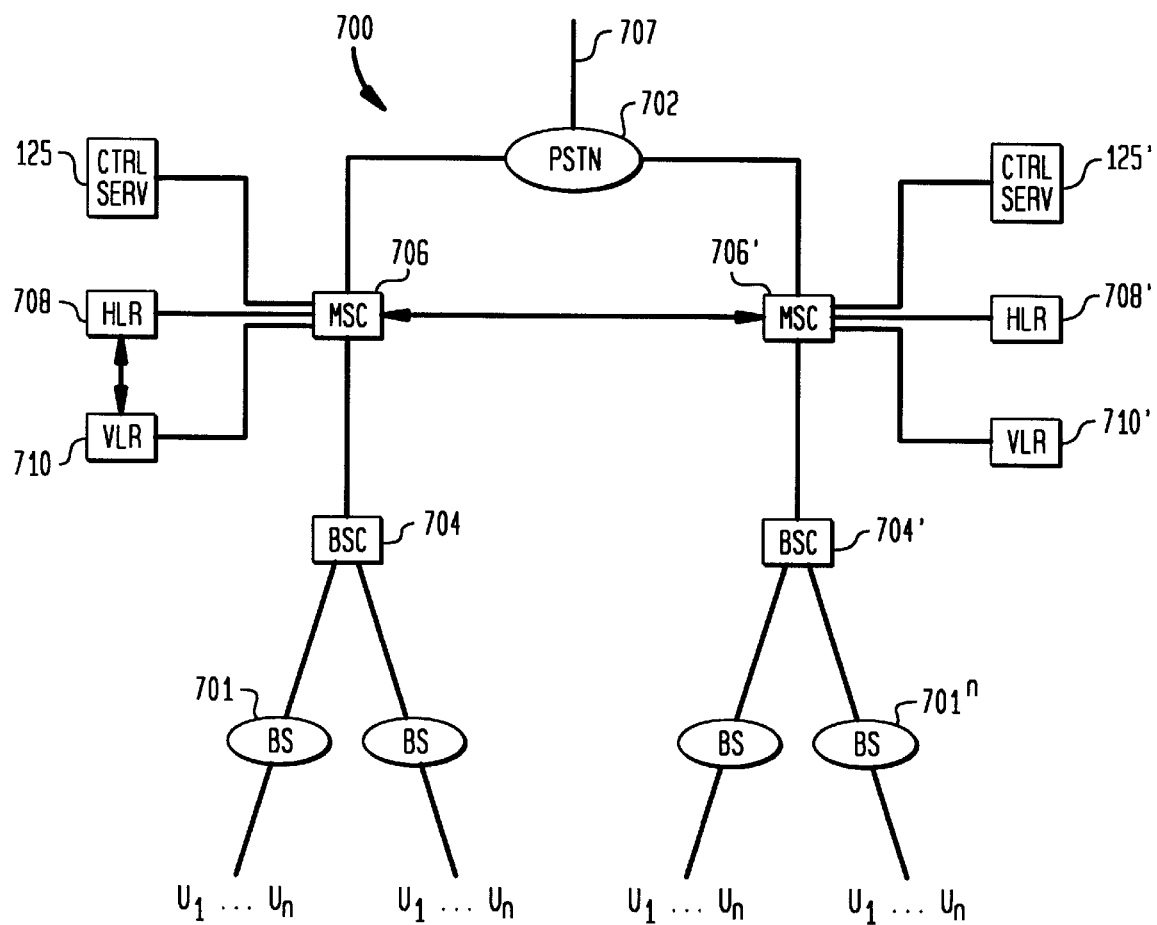
FIG. 6 is a block diagram of a cellular network which incorporates the principles of the present invention.

FIG. 6 discloses a budgeted calling service incorporated into a mobile telephone system 700. Customer/Users $U_1 \ldots U_2$ are connected to base stations $701^1 \ldots 701^n$ for transmitting and receiving calls among the customer/users and to a public switch telephone network (PSTN) 702. The base stations $701^1 \ldots, 701^n$ are connected to the base station controller 704 which manages the calls among the connected base stations for transmission to a mobile switching centers $706^1 \ldots 706^n$ The mobile switching centers 706 are coupled to the network 702 for transmitting and receiving calls from customers 707 connected to the network 702. The mobile switching center 706 includes a Home Location Register HLR) 708 which is stored on a computer and accessed whenever a mobile customer or subscriber is called or registers within an area. The home location register identifies the subscriber and indicates the part of the country in which the subscriber is present or is normally located. When accessed, the information about the individual subscriber is transferred to the mobile switching center 706 serving the cell where the subscriber is located. Associated with the home location register is a Visitor Location Register (VLR) 710. When a mobile phone is switched on, its data will be retrieved from a HLR somewhere on the network and stored in the VLR on the switch serving the cells in the area where the phone is located. The HLR will note the identity of the current VLR and the fact that the mobile is inactive. Incoming calls for the mobile will interrogate the HLR based on the knowledge of the mobile's number and where each number is stored. When the mobile unit is activated, the call will be routed to an appropriate VLR for paging the mobile. The control server 125 is connected to the switching centers 706. As budgeted calls are initiated by a mobile subscriber, the call is initially directed to the control server 125 which implements the process of FIG. 3 after comparing the address of the customer in the home location register with the provisioning data base. The call is completed and monitored by the mobile switching center after the routing information is supplied by the server 125 and the time and dollar balance for the customer are established. The voice response unit is initiated by the control server and the welcome announcement is played by the voice response unit and transmitted to the calling party. The call is monitored by the control server and, as previously described in conjunction with FIG. 3, the hard-stop and soft-stop announcements are played prior to the expiration of the time and dollar balance in the customer account stored in the rating database.

In summary, the present invention provides budgeted calling service for customers identified with a unique telephone line in which the calling time and dollar amount are stored in a control server coupled to a communications network. A customer activates the service using the regular toll prefix "1" and not a special toll number or a credit card number, as in the prior art. The server responds to the customers and monitors their calls for time and dollar amounts against an account stored in the server. When the account balance approaches a limit, the control server activates a voice response unit to send announcements to the calling customer indicating the account balance has been expended. The customer has the option of terminating the call or continuing the call with subsequent payment for the unaccounted balance. The customer is also provided an "800" number or, alternatively, may be requested to contact the local service representative for renewing the budgeted amount or extending the budgeted amount. The options to call an "800" number or contact a local service representative facilitates using the communication network while still controlling the time and dollar amount for calls placed in the network. The customer may arrange payment for the budgeted service on a pre-paid or post-paid basis. Also, the customer may modify the hard stop option by authorizing calls exceeding the budgeted amount to be charged to his iregular telephone account.

While the invention has been shown and described with respect to specific embodiments, various modifications may be made therein without departing from the spirit and scope of the invention, as defined in the appended claims, in which:

We claim:

1. In a communication system including at least one network switch coupled, in part, to at least one caller via a telephone line uniquely associated with that caller for receiving a call from that caller to a destination and for establishing the caller's identity in accordance with a number associated with the caller's telephone line, comprising:

a) a database storing information in accordance with said caller's telephone line number, said information indicating a budgeted calling amount for said caller;

b) a control processor responsive to a call initiated by the caller for accessing the data base to obtain said information in accordance with said caller's telephone line number and for establishing a maximum allowable time length for the caller based on said information and on said destination of said caller's call, said processor further monitoring said call in progress to determine how much time has elapsed for said call; and c) a voice response unit coupled to the processor and to the network for sending at least one message to the caller indicative of the amount of time available to the caller.

2. The system of claim 1 further comprising means for the call to be placed directly to a called party without accessing a special toll number.

3. The system of claim 1 further comprising:
   a) means for sending the at least one message to the caller prior to the expiration of the budgeted calling time and amount and terminating the call upon expiration of the budgeted calling time and amount.

4. The system of claim 1 further comprising:
   a) means for sending the at least one message to the caller prior to the expiration of the budgeted calling time and amount and continuing the call with a warning to renew or extend the budgeted calling time and amount upon completion of the call.

5. The system of claim 1 further comprising:
   a) means for sending the at least one message to the caller prior to the expiration of the budgeted calling time and amount and allowing the call and subsequent calls to continue after expiration of the budgeted calling time and amount subject to the calling costs thereof being billed to the calling customer.

6. The system of claim 1 further comprising:
   a) means for sending the at least one message to the caller prior to the expiration of the budgeted calling time and amount and allowing the call to be completed after expiration of the budgeted calling time subject to an additional charge to the customer.

7. The system of claim 1 further comprising;
   a) means for enabling the calling customer to pre-pay the budgeted calling time and amount before initiating a call using the budgeted time and amount.

8. The system of claim 1 further comprising:
   a) means for enabling the calling customer to pay the budgeted calling time and amount after the budgeted time and amount have been depleted.

9. The system of claim 1 wherein the data bases are distributed throughout the network.

10. The system of claim 1 wherein the databases include stored program instructions for implementing the announcement and monitoring processes in the control process and associated with the call.

11. The system of claim 1 wherein the control processor and voice response unit are connected to a local exchange carrier.

12. The system of claim 1 in which the communication system is a wireless telephone system.

13. In a communication system including a network coupled through local exchange carriers and a network switch to a telephone line uniquely associated with a customer having budgeted telephone calling time and an amount available for telephone calling recorded in the system, a server coupled to the switch for automated control of the customer budgeted telephone calling time and calling costs, comprising:
   a) a control processor having access to a rating database and a telephone call routing database; the rating database containing stored information indicating remaining customer prepaid budgeted telephone calling time and cost available to each calling customer; the routing database providing instruction for directing routing of budgeted telephone calls from the calling customers to called customers, after acceptance by the processor;
   b) a voice response unit coupled to the processor and the network for sending messages to the calling customer in response to the processor at the beginning of each budgeted telephone call to the called customer indicating remaining budgeted telephone calling time and amount available to the calling customer for the telephone call; and
   c) means for tracking the budgeted telephone call in real time and initiating a voice message advising the calling customer when the available time for the telephone call will terminate, using the budgeted calling time and amount.

14. The communication system of claim 1 further comprising:
   a) means for disconnecting the budgeted telephone call when the time and cost thereof exceed the available budgeted time and amount for the calling customer.

15. The communication system of claim 1 further comprising;
   a) means for extending the telephone call after the telephone call has exceeded the budgeted time and amount and before the telephone call has been terminated.

16. A method for enabling at least one caller placing a call to a call destination through a communications network via, in part, a telephone line having a number uniquely and permanently assigned to said one caller to budget call costs, comprising the steps of:
   a) storing in a rating data base budgeted information for said caller in accordance with said caller's unique and permanently assigned telephone line number;
   b) receiving said call placed by said caller, and in response, establishing said caller's telephone line number;
   c) accessing a routing database for a call cost to direct the call to the call destination;
   d) accessing the rating data base to retrieve said budgeted information in accordance with the caller's telephone line number;
   e) determining from said budgeted information and from said call cost for said call destination, a maximum allowable time length for said call;
   f) monitoring the call in progress to determine how much time has elapsed; and
   g) providing at least one voice announcement to the caller indicative of the time available to the caller.

17. In a communication system including a network coupled through local exchange carriers and a network switch to at least one caller at a permanently assigned telephone number and having a budgeted telephone calling time and amount available for telephone calling recorded in the system, a method for automated control of the budgeted telephone calls and calling costs, comprising:
   a) initiating a telephone call in the system at the permanently assigned number by a customer using the budgeted time and amount recorded in the system;
   b) accessing a rating database using a control processor in response to the telephone call; the rating data base containing stored information indicating remaining budgeted telephone calling time and amount available to the calling customer;
   c) accessing a telephone call routing database providing instruction for routing the telephone call from the calling customer to a called customer and calling cost for such call, after the telephone call has been accepted by the processor;
   d) determining from said budgeted information and from said calling cost a maximum allowable time length for said call;
   e) sending a voice message to the calling customer at the beginning of the telephone call to the called customer indicating remaining budgeted telephone calling time and amount available to the calling customer for the telephone call, based upon the maximum allowable time length for said call; and f) tracking the telephone call in real time and initiating a voice message advising the calling customer when the available time for the telephone call will terminate.

18. The methods of claims 16 and 17 further comprising the step of:

g) enabling the caller in advance of the call to select between a first option identified as a "hard-stop" and a second option identified as a "soft-stop" for terminating the call when the budgeted amount for telephone calls has been exceeded.

19. The methods of claim 18 wherein the "hard-stop" provides the caller a call termination warning in advance of exceeding the budgeted amount, after which the call is terminated or the caller is provided with an alternative for call payment.

20. The methods of claim 19 wherein the "soft-stop" provides the caller, after exceeding the budgeted amount, notice of a change in call payment method while allowing the caller to continue calls in progress and place new calls.

* * * * *